April 28, 1925.
D. R. TAGGART
1,535,506
AUTOMOBILE FOLDING BED
Filed Dec. 12, 1923
2 Sheets-Sheet 1
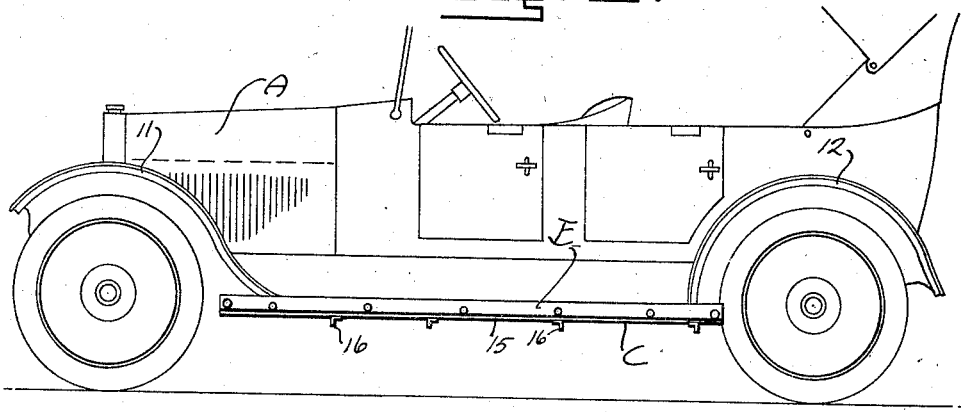
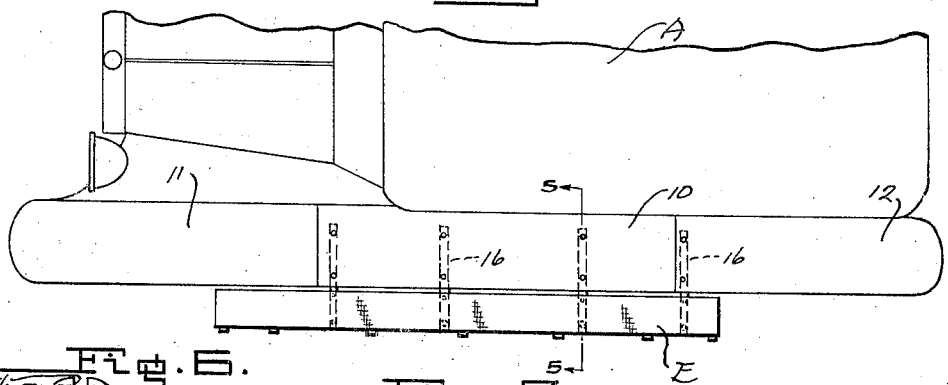
Inventor
David R. Taggart April 28, 1925.
D. R. TAGGART
AUTOMOBILE FOLDING BED
Filed Dec. 12, 1923
1,535,506
2 Sheets-Sheet 2
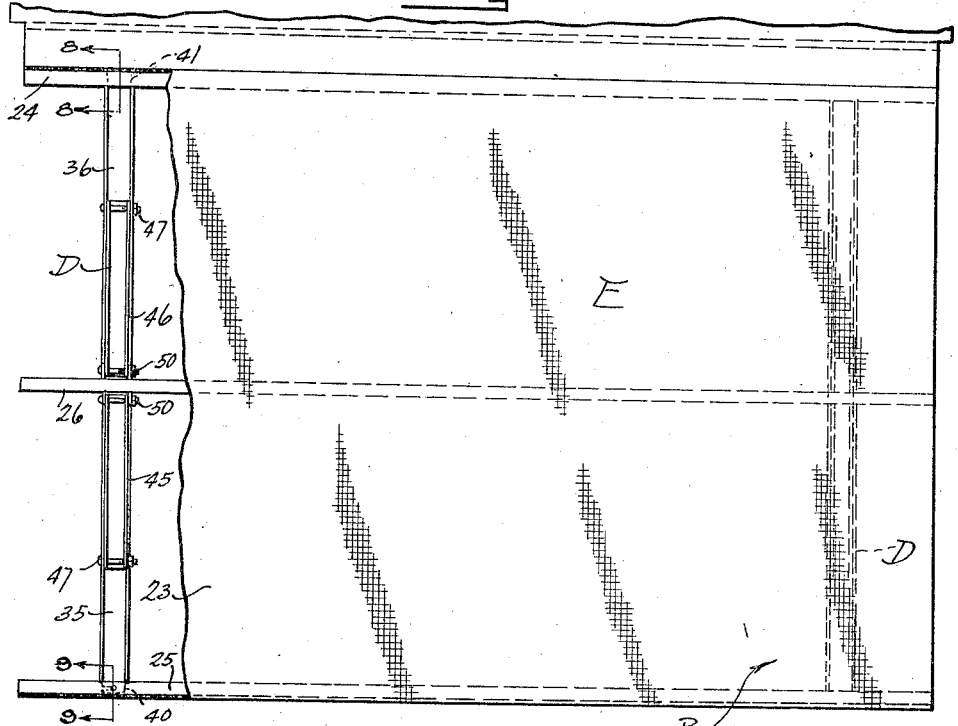
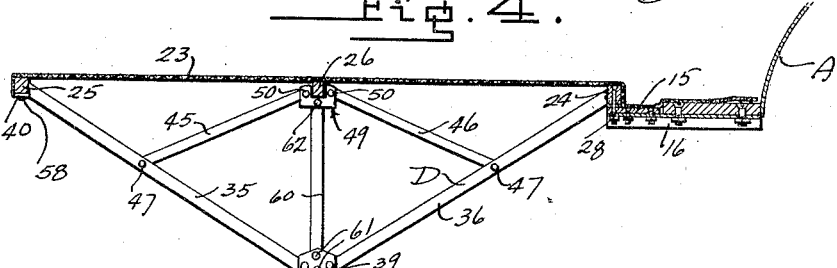
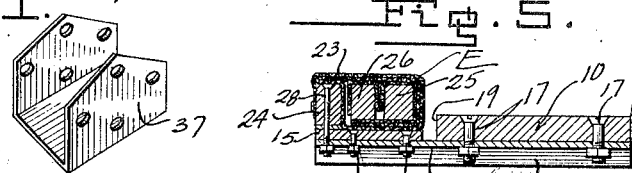
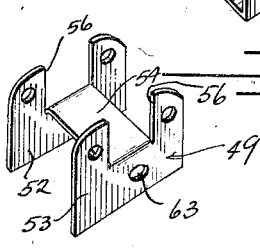
Inventor
David R. Taggart
By Lancaster and Allwine
Attorneys Patented Apr. 28, 1925.

1,535,506

UNITED STATES PATENT OFFICE.

DAVID R. TAGGART, OF TOPEKA, KANSAS.

AUTOMOBILE FOLDING BED.

Application filed December 12, 1923. Serial No. 680,193.

*To all whom it may concern:*

Be it known that I, DAVID R. TAGGART, a citizen of the United States, residing at Topeka, in the county of Shawnee and State of Kansas, have invented certain new and useful Improvements in an Automobile Folding Bed, of which the following is a specification.

This invention relates to an improved folding bed primarily adapted for use in connection with automobiles and like vehicles.

The primary object of this invention is the provision of a relatively simple and compact type of folding cot which may be conveniently attached to an automotive vehicle in a convenient and out of the way location and which is of such nature as to provide sleeping space or compartment for more than one person.

A further object of this invention is the provision of a novel type of folding cot construction embodying a novel collapsible frame.

A further object of this invention is the provision of a folding cot construction embodying novel structural features, and means for securing the same to a running board of the automotive vehicle so as not to obstruct the running board.

Other objects and advantages of this invention will be apparent during the course of the following detailed description.

In the accompanying drawings, forming a part of this specification, and wherein similar reference characters designate corresponding parts throughout the several views.

Figure 1 is a side elevation of an automotive vehicle, showing the running board of the same equipped with a novel bracket construction and details of the bed supported in folded relation thereby.

Fig. 2 is a plan view of the automotive vehicle illustrated in Figure 1, with the novel folding bed details supported in folded relation thereon.

Fig. 3 is a plan view of the improved folding cot, showing the same in extended relation for use.

Fig. 4 is a cross sectional view taken transversely of the folding cot, and showing the novel supporting construction therefor.

Fig. 5 is a cross sectional view taken substantially on the line 5—5 of Figure 2.

Fig. 6 is a side elevation of a support member of the folding bed in a collapsed relation.

Fig. 7 is a cross sectional view taken through a portion of the folding cot supporting construction.

Fig. 8 is a cross sectional view taken through a portion of the cot construction substantially on the line 8—8 of Figure 3.

Fig. 9 is a cross sectional view taken substantially on the line 9—9 of Figure 3, and Figs. 10, 11 and 12 are perspective views of details of the improved folding cot.

In the drawings, wherein for the purpose of illustration is shown but the preferred embodiment of this invention the letter A may generally designate an automotive vehicle, with which the improved bed B is preferably associated. The bed B preferably includes a bracket construction C supported by the vehicle A; collapsible supporting constructions or members D; and a bed bottom or body rest construction E.

The automotive vehicle A may be of the conventional construction, and for purposes of this invention may include a side running board 10, forwardly and rearwardly of which the fenders 11 and 12 respectively are provided.

The vehicle bracket C preferably includes a supporting board 15, which is relatively of less dimension in thickness than the running board 10. Angle pieces 16 are preferably bolted, as at 17, beneath the running board 10, so that they extend outwardly of the side edge 19 of said running board, and support the board or member 15 thereon; being bolted together as by bolts 20, so that the board or member 15 is located outwardly of the side edge 19 of the running board 10, as not to interfere in any manner whatsoever with the same. The bed supporting board 15 is longer than the running board 10, and the angles 16 support the same so that it extends forwardly and rearwardly of the running board 10, substantially as is illustrated in Figures 1 and 2 of the drawings.

Referring to the bed bottom or body rest construction E, the same preferably includes a flexible sheet of fabric 23, which has the longitudinally extending side rails 24 and 25 connected thereto at the side marginal portions thereof, and the intermediate rail 26; all of said rails extending substantially parallel with each other when the bottom construction E is either extended or folded.

The side rail 24 is preferably detachably secured upon the plate or member 15 of the bracket construction C, as by bolt means 28, and adjacent the outer portion of the plate 15, substantially as is illustrated in the drawings. This rail 24 preferably rests upon steel plates 30 which may be secured thereto as by means of screws 31 or the like, and just upwardly of the steel plates 30, and recessed in the rail 24 a socket 33 is provided which is open at the outer side of the rail 24, and the purpose of which will be subsequently described in connection with the attachment of the collapsible supporting members D.

The supports D are placed at the top and bottom ends of the bed B, and in this connection it is to be noted that the bed B at each side of the intermediate rail 26 provides a sleeping compartment or space; the person sleeping parallel with the running board and not transversely thereto as in the ordinary instance where folding beds are used in connection with automotive vehicles.

Each collapsible support member D comprises the diagonal supporting arms 35 and 36 which are pivotally connected to a channel shaped clip 37 at their proximate ends, as by means of rivets or other elements 39. The arm members 35 and 36 may be of any approved material, either wood, or of metal, and if constructed of the latter they may be of channel shape cross section with the leg portions thereof pivoted by means of the rivets 39 to the clip 37. At their outer ends the arms or brace members 35 and 36 are provided with connecting tongues 40 and 41 respectively; the tongues 40 of the member 35 being slotted transversely, as at 42. The tongues 40 and 41 are preferably struck from the bight portion of the arms 35 and 36 respectively, if these arms are made of channel metal, although if they are constructed of wood the tongues may be of metal screwed to the wood in any approved manner. The tongues 40 and 41, of course, extend outwardly of the free ends of their respective arms, and in an obtuse angular relation with respect to their respective arms; the plane of the tongues 40 and 41 being at right angles to the edges 44 of the upstanding or leg portions of the arms 35 and 36. Connecting arms 45 and 46 are respectively provided for the arms 35 and 36, at an end of the same being pivotally connected, as at 47, intermediate the ends of their respective arms 35 and 36. The connecting arms 45 and 46 are pivotally connected at their proximate ends, to a saddle clip 49, as by bolts 50 or the like. The saddle clip 49 is of a novel construction, preferably being struck from a single piece of metal, and includes side plates 52 and 53, with the cross piece 54 connecting said side plates and so struck therefrom as to provide the aligning recesses 56 in said side plate, and across which and upon the cross piece 54 of which the intermediate rail 26 of the bed bottom construction E rests, and as will be subsequently mentioned.

Referring to the manner of application of the support members D, the tongues 41 of the arms 36 are disposed in the socket openings 33 of the running board rail 24 above the plate 30 as shown in Figure 8; the arms 35 and 36 of the members D, of course, having been expanded into substantially V-shaped relation. The bed bottom or body rest construction E is then unrolled, and the intermediate rail 26 rests transversely in the recesses provided by the saddle clips 49, and the outside rail 25 rests upon the laterally extending tongues 40 of the arms 35; suitable bolts or screws 58 being provided in depending relation from the rail 25, and which are laterally received in the side slots 42 of the tongues 40, so that the rail 25 has a stable connection with the outer ends of the support members D. It is to be particularly noted that the rails 24 and 25 not only rest upon the running board and tongue portions of the members D, but at the sides thereof abut the edges 44 of the collapsible arms 35 and 36, so that expansion of the members D will force the rails 24 and 25 apart for stretching the fabric 23 of the bed.

In connection with the support members D it may be desirable to provide a central supporting post 60, which at the lower end thereof may be connected by bolts 61 to the clip 37, and at its upper end detachably connected by a pin element 62 to the saddle clip 49, the pin 62 being disposed through openings 63 in said saddle clip. This post 60 is not an essential element of the supporting members D, but assists in reinforcing the bed and maintaining the same in a taut relation when extended.

When not in use the bed bottom or body rest construction E of the bed A is rolled and placed upon the bracket C, in the compact and assembled relation substantially as is illustrated in the drawings, and it can readily be seen that when in this position the running board 10 is not obstructed in any manner thereby. The supporting members D may be collapsed into the condition substantially illustrated in Figure 6, and secured in such folded relation by means of straps 65.

From the foregoing description of this invention it is apparent that a folding cot or bed construction for use in connection with motor vehicles has been provided, which is very compact, simple in construction, and which may be easily extended or folded as desired, and which is adapted for supporting more than one person.

Various changes in the shape, size, and arrangement of parts may be made to the form of the invention herein shown and described, without departing from the spirit of the same or the scope of the claims.

I claim:

1. A folding bed construction comprising an elongated board or plate member, angles adapted to be detachably connected to the running board of a vehicle below the same to extend laterally outwardly thereof, means for connecting the board or plate to the outwardly extending ends of said angles so that the same is positioned laterally of the running board and longitudinally thereof, a flexible body supporting member foldably carried by said board or plate, and collapsible supporting means for the body supporting member.

2. A folding bed construction comprising bracket members adapted to be connected to a running board of a vehicle and extend laterally outwardly thereof, a supporting strip carried by said bracket members for disposition longitudinally of the running board when the bracket members are connected to the running board, a flexible sheet of material and rails connected therewith and disposed substantially parallel to the supporting strip, one of said rails being secured to the supporting strip and said rails and sheet adapted to be rolled into a compact mass and supported upon the supporting strip beyond the outer side edge of the running board.

3. In a collapsible bed construction a support adapted to be connected with the running board of an automotive vehicle and provided with sockets, a body supporting member foldably carried by the said support and including an outer side rail, and collapsible supporting members for the bed including tongues which may be attached in the sockets of said first mentioned support and to the outer rail of said body supporting member.

DAVID R. TAGGART.